United States Patent [19]

Schairer

[11] 4,036,452

[45] July 19, 1977

[54] RETRACTABLE ENGINE NOISE SUPPRESSION SYSTEM FOR OVER-THE-WING JET AIRCRAFT

[75] Inventor: George S. Schairer, Bellevue, Wash.

[73] Assignee: The Boeing Company, Seattle, Wash.

[21] Appl. No.: 683,771

[22] Filed: May 6, 1976

Related U.S. Application Data

[63] Continuation of Ser. No. 544,238, Jan. 27, 1975, abandoned.

[51] Int. Cl.² .............................................. B64D 33/06
[52] U.S. Cl. ............................. 244/1 N; 181/33 HB;
                                                             239/265.13
[58] Field of Search ............. 244/1 N, 74, 53 R, 130,
        244/15, 110 B, 12 B, 12 D, 12.3, 125; 60/271,
                 363; 239/265.11, 265.13; 181/33 H, 33 B, 33
                                                             HC, 33 HD

[56] References Cited

U.S. PATENT DOCUMENTS

| | | | |
|---|---|---|---|
| 2,991,961 | 7/1961 | Rogallo et al. | 244/15 X |
| 3,018,983 | 1/1962 | Davidson | 244/15 |
| 3,067,968 | 12/1962 | Hempenstall | 244/74 |
| 3,088,694 | 5/1963 | Stirgwolt et al. | 244/12 B |
| 3,612,212 | 10/1971 | MacDonald | 181/33 HC |
| 3,625,009 | 12/1971 | Schairer et al. | 181/33 HB X |
| 3,677,501 | 7/1972 | Denning | 244/1 N X |
| 3,710,890 | 1/1973 | True et al. | 181/33 HC |

FOREIGN PATENT DOCUMENTS

| | | | |
|---|---|---|---|
| 987,507 | 3/1965 | United Kingdom | 181/33 HC |
| 1,224,473 | 3/1971 | United Kingdom | |
| 1,243,392 | 8/1971 | United Kingdom | |

Primary Examiner—Trygve M. Blix
Assistant Examiner—Barry L. Kelmachter
Attorney, Agent, or Firm—Christensen, O'Connor, Garrison & Havelka

[57] ABSTRACT

Retractable multiple aperture arrays, mounted behind jet engines that produce jet exhausts that pass chordwise over the wings of an aircraft, are disclosed. In their operative positions, a multiple aperture array lies in the exhaust path of each engine, immediately rearwardly of the engine nacelle. In this position, in a conventional manner, the arrays split the exhausts into separate streams, which entrain ambient air. The entrained ambient air mixes with the separated streams in the region where the streams recombine to suppress engine exhaust noise and move the noise source centers of the engine exhausts to positions above the wings. As a result, the wings act to shield noise from the line-of-sight community located generally beneath the wings. When not in use, the mutliple aperture arrays are each stowed in a compartment formed in the upper surface of the wing, beneath and immediately rearwardly of the engine with which the array is associated. Doors that close the entrance to these compartments may remain open when the multiple aperture arrays are in their operative positions to provide lateral noise shielding.

7 Claims, 5 Drawing Figures

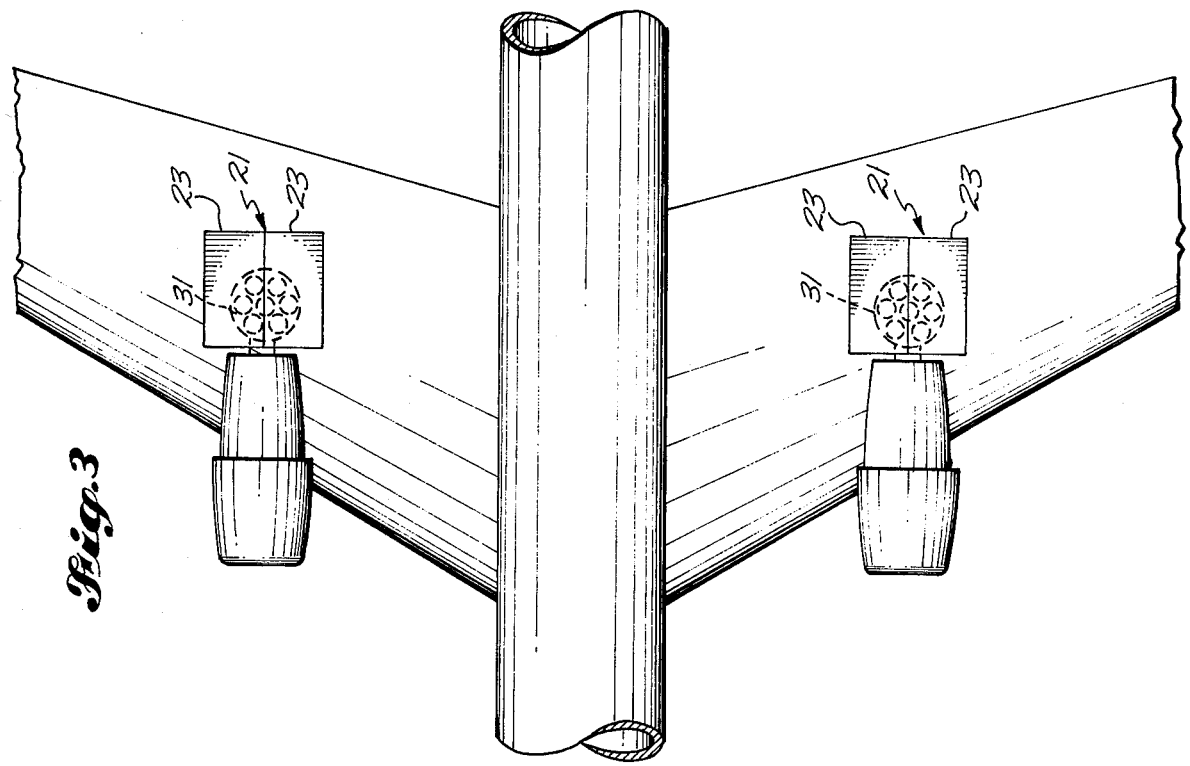
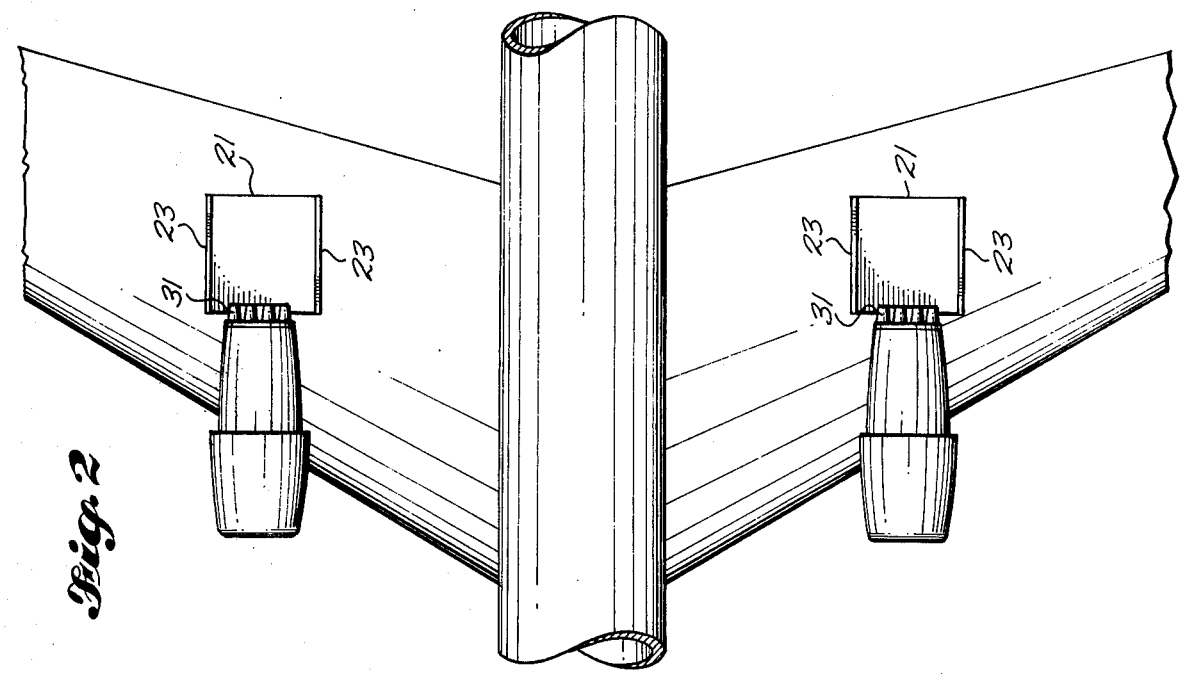

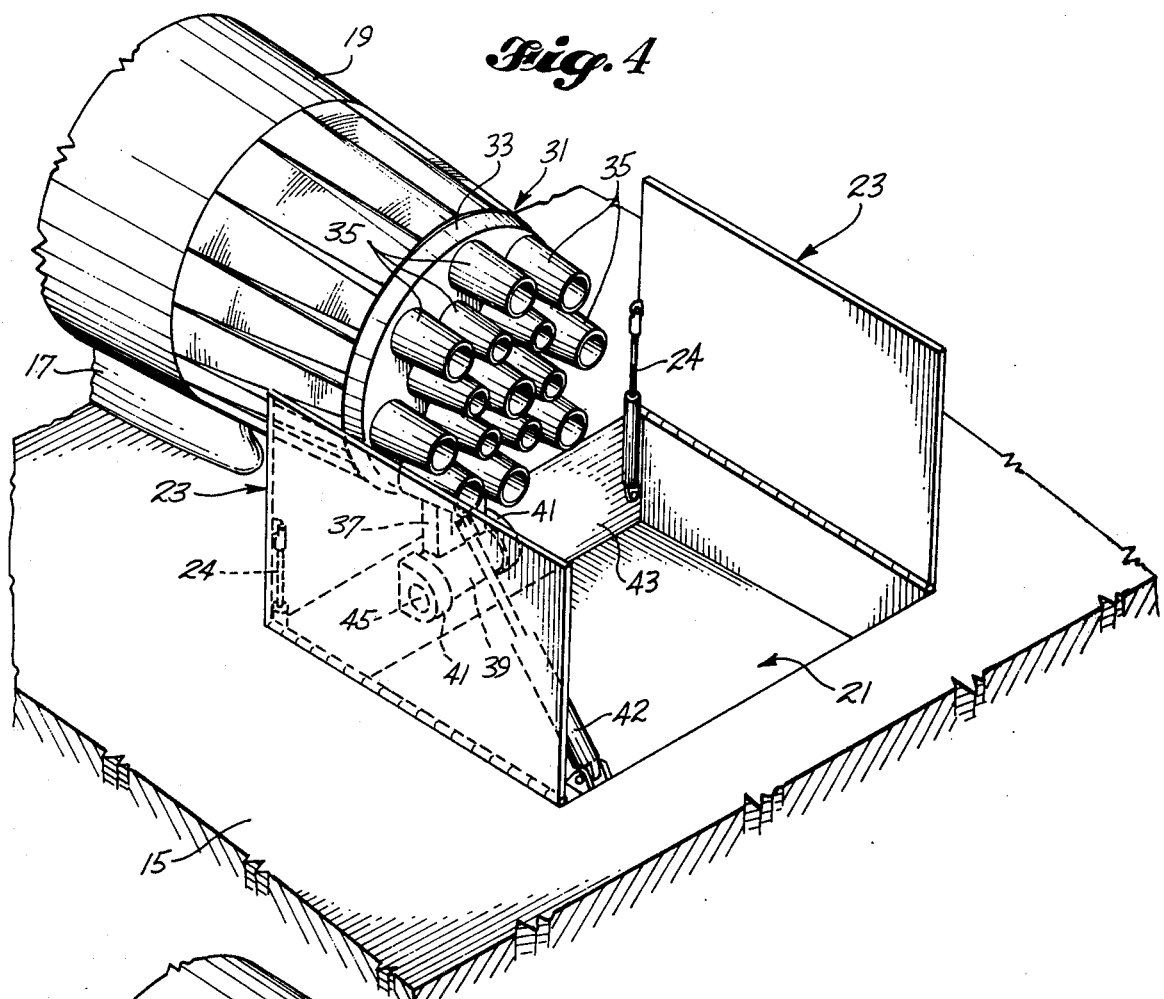
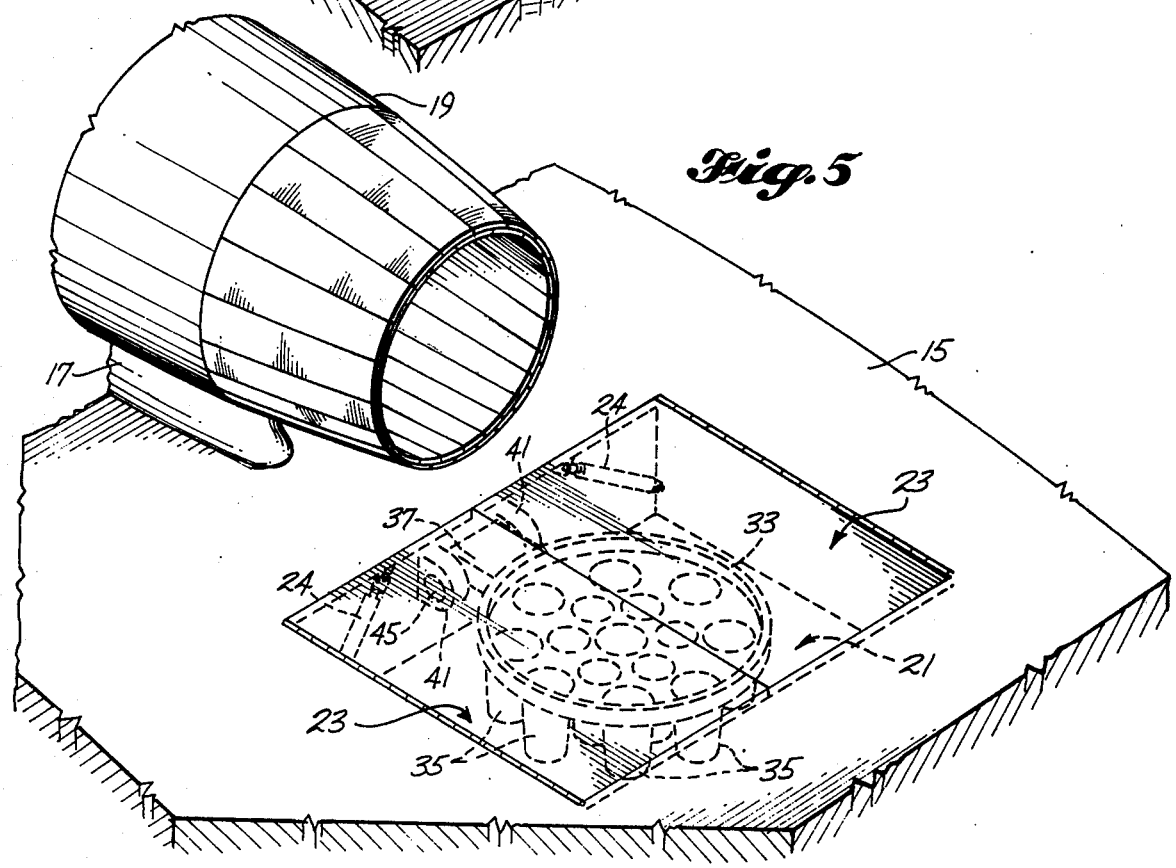

RETRACTABLE ENGINE NOISE SUPPRESSION SYSTEM FOR OVER-THE-WING JET AIRCRAFT

This is a continuation, of application Ser. No. 544,238, filed Jan. 27, 1975 now abandoned.

BACKGROUND OF THE INVENTION

This invention is directed to noise suppression and, more particularly, to the suppression of noise created by a jet or fan engine exhaust.

Ever since the advent of jet powered aviation, proposals directed to diminishing the noise produced by jet engines have been made. Many of these proposals have been reduced to practical structures and incorporated into modern jet aircraft. Engines with low and high bypass ratios fall in this category. Initially, low bypass ratios were found adequate to provide the necessary noise suppression. More recently, jet engines with high bypass ratios have been developed to further reduce the noise of the jet exhaust. Other apparatus, such as acoustic nacelles, mechanisms for controlling fan blade tip speeds, etc., have also been developed in an attempt to reduce jet engine exhaust noise. While each of these different approaches has been somewhat successful, noise remains a problem.

It has been noted through jet engine noise research that an array of apertures, for example an array of circular or oval tubes, located external to the engine, effectively move the center of the noise source created by jet and fan jet engines closer to the rear of the engine. In the past, however, this effect has not found widespread use because, even though it provides some noise suppression, it also creates a number of detrimental effects. More specifically, the inclusion of a multiple tube array in a jet exhaust stream has been found to decrease engine thrust and increase drag. Because engine thrust is decreased, fuel economy has also decreased. In other words, engine efficiency is decreased.

It has been suggested by the prior art that multiple tube arrays only be mounted in the jet exhaust stream when noise suppression is desired, i.e., when the aircraft is on the ground or at a low altitude. In this regard, attention is directed to U.S. Pat. No. 3,067,968 issued to Charles W. Heppenstall for "Retractable Jet Engine Noise Suppressor." The major problem with devices of the type disclosed in this patent is that while they provide a mechanical system for withdrawing the multiple tube array during cruise conditions, they do so in a manner that unduly disturbs the wind airflow. Thus, additional problems result from the use of systems of the type disclosed in this patent. Further, because of the engine location, such arrangements cannot take advantage of naturally occurring sound barriers, such as the wings of the aircraft.

In the past few years, development work directed to mounting jet engines above and forward of the wings, as opposed to in (or beneath) the wings, has been undertaken both for subsonic and for supersonic aircraft. In both cases, engine noise suppression is desired. This invention is directed to noise suppression systems suitable for use with such aircraft.

More specifically, as will be better understood from the following description, this invention is directed to a noise suppression system suitable for use in combination with subsonic or supersonic aircraft wherein the jet exhaust path of a jet or fan engine passes chordwise above the wing. The invention is suitable for suppressing noise when suppression is particularly desirable (e.g., during takeoff and landing, and when the aircraft is on the ground).

It is an object of this invention to provide a jet or fan engine noise suppression system.

It is a further object of this invention to provide a jet or fan engine noise supression method and apparatus particularly suitable for use with aircraft having engine exhaust streams that pass above the wings of the aircraft.

SUMMARY OF THE INVENTION

In accordance with principles of this invention, an engine noise suppression system that is useful in combination with a jet aircraft wherein the jet engine exhaust streams pass above the upper surface of the wings of the aircraft is provided. The noise suppression system of the invention comprises multiple aperture arrays (one for each engine) located such that the apertures lie in, and are aligned with, an associated jet engine exhaust stream. The multiple aperture arrays "move" the noise sources created by the engines nearer to the engines, along their longitudinal axis. The movement is such that if the engines are positioned correctly the "center" of the noise source lies above the wings. The wings then act as a shield between the noise source and the line-of-sight portion of the surrounding environment intersected by the wing. This surrounding portion generally flares outwardly from beneath the wings.

While multiple tube arrays, permanently located behind the engine nacelle, can be used to cause the desired "positioning" of the noise source, such an arrangement is undesirable from an engine efficiency point of view, for the reasons discussed above. Such arrays are particularly undesirable for use with supersonic aircraft because only a small portion of the takeoff weight of such an aircraft (e.g., 6%) is payload. If the size and, thus, the weight of the engine is increased so that thrust is increased to overcome thrust losses due to the inclusion of such a permanently located array, obviously, payload is decreased by a large amount.

Therefore, in accordance with further principles of this invention, the multiple aperture arrays are movable between operative and stowed positions. In the operative position, the multiple aperture arrays lie in the exhaust streams generated by the engines. In the stowed positions, the multiple aperture arrays are housed in compartments located in the wings immediately rearwardly of the rear ends of the nacelles of their associated engines.

In accordance with further principles of this invention, the exhaust nozzles of the engines are variable area exhaust nozzles adapted to increase in area when the multiple aperture arrays are in their operative positions.

In accordance with other principles of this invention each compartment is closed by at least one door when its associated array is in its stowed position. When the arrays are in their operative positions, the doors may either be closed or lie in chordwise planes generally perpendicular to the wing and parallel to the local airflow of their related jet engine exhaust stream so as to laterally suppress noise. Preferably, if the doors are closed, their outer surfaces are covered with a noise absorbent material. Alternatively, if they are open, their inner surfaces are covered by a noise absorbent material.

In accordance with still other principles of this invention, multiple doors are provided for each compartment. When closed, the doors form a portion of the upper surface of the wings. When open, the doors lie on either side of the main longitudinal axis of the exhaust stream of their associated jet engine so as to provide lateral noise suppression on both sides of the stream.

It will be appreciated from the foregoing brief summary that the invention provides a jet or fan engine noise suppression system suitable for use in combination with aircraft wherein engine exhaust streams pass above associated wing surfaces. Because the noie suppression system can be formed in a retractable manner, engine noise may be suppressed when the aircraft is on the ground or at low altitudes and allowed when it is unnecessary to suppress it — at higher altitudes. Because the noise suppressor can be retracted at higher altitudes (or under other conditions when noise suppression is unnecessary) overall thrust losses are reduced. Hence, use of the invention relates in an improved payload capability. Moreover, the noise suppressors are retracted in a manner that does not disturb air flow over the wings of the aircraft.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 2 is a top plan view of a portion of an aircraft illustrating a preferred embodiment of the invention with the multiple aperture array in its operative position;

FIG. 3 is a top plan view of a portion of an aircraft illustrating a preferred embodiment of the invention with the multiple aperture array in its stowed position;

FIG. 4 is an enlarged perspective view illustrating a multiple aperture array in its operative position; and, FIG. 5 is an enlarged perspective view illustrating a multiple aperture array in its stowed position.

DESCRIPTION OF THE PREFERRED EMBODIMENT

Figure 1:
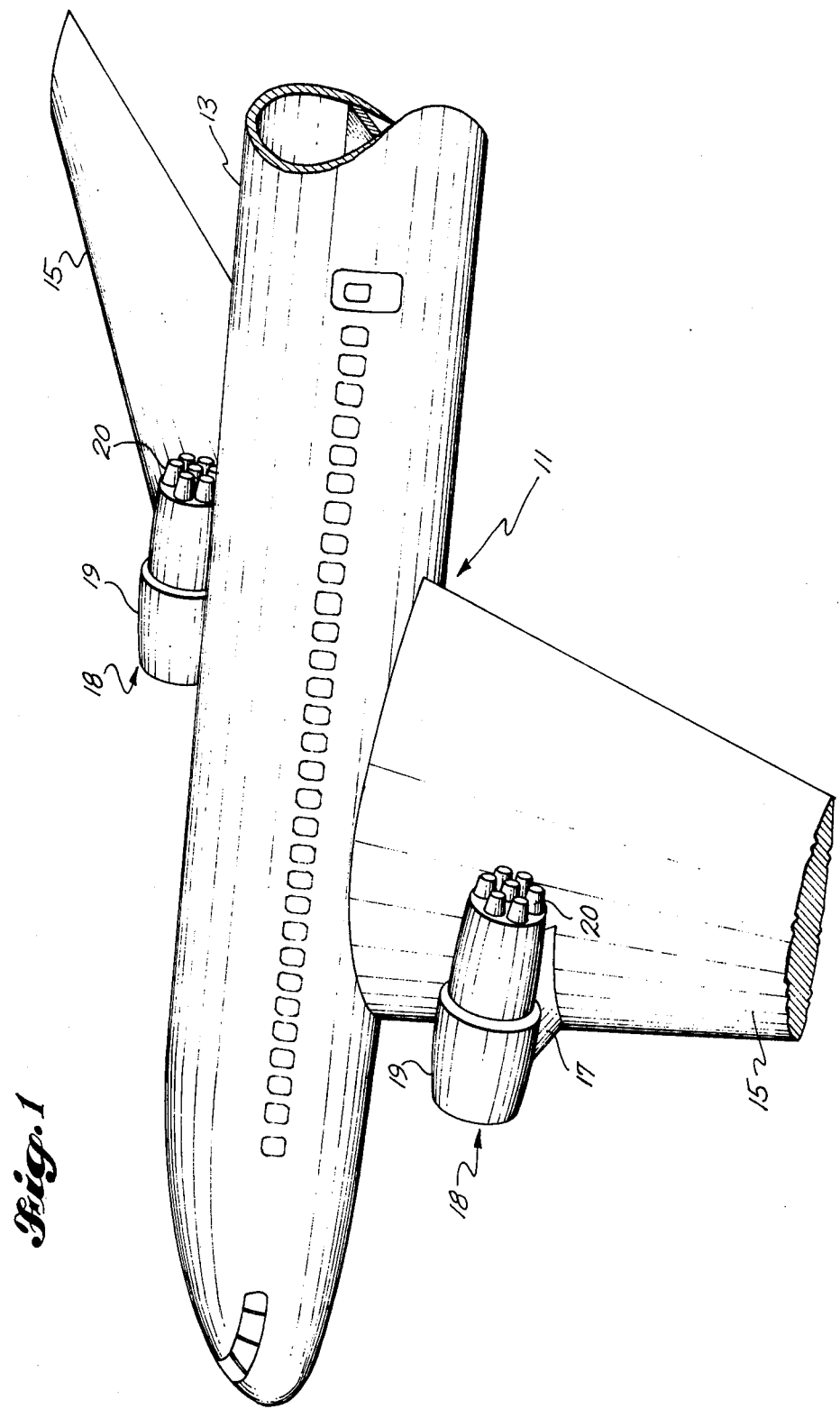
FIG. 1 is a perspective view from the left rear quadrant of a portion of an aircraft including a preferred embodiment of the invention.

FIG. 1 illustrates a portion of an aircraft 11 including a fuselage 13 and a pair of outwardly extending wings 15. Supported above and forward of the spanwise center line of each wing 15 by suitable support pylons 17 are jet or fan engines 18 surrounded by nacelles 19. As usual, the engines 18 and their nacelles 19 are arrayed such that their longitudinal axes are spaced from, but lie generally parallel to, the longitudinal axis of the fuselage 13. Thus, the path of the exhaust stream of each engine 18 is above its associated wing 15.

Located at the rear of each engine 18 is a multiple aperture array 20. The multiple apertue arrays 20 may take on any one of several forms well known in the art. For example, the arrays may be formed of a plurality of tubes or cones having substantially parallel longitudinal axes that lie parallel to the longitudinal axes of their associated engines. Or they may take the form corrugations or radial spokes, for other examples. Other known forms may also be used, as long as they accomplish the function hereinafter described. Hence, except for a brief discussion of the structural natue of these arrays, necessary to an understanding of the invention, they are not discussed here in detail. However, attention is directed to several articles that discuss jet aircraft noise and such arrays, and the like. These articles are: "Jet Noise" by M. J. Lighthill, AIAA Journal, Vol. July 1, 1963, pp. 1507–1517; "The Evolution of the Engine Noise Problem" by F. B. Greatrex and R. Bridge, Aircraft Engineering, Vol. XXXIX, February 1967, pp. 6–10; and "Perspective of SST Aircraft Noise Problem" by George S. Schairer, John V. O'Keefe and Paul E. Johnson, AIAA paper 68–1023 present at the AIAA 5th Annual Meeting and Technical Display, Oct. 21–24, 1963.

The primary function of the multiple aperture arrays is to move the center of the noise created by the engines closer to the engines along the longitudinal axis thereof. This movement is a result of the arrays splitting the exhaust into streams that entrain ambient air, which mixes with the split exhaust streams in the region where the streams merge, as discussed in the foregoing articles, particularly A.I.A.A. Paper 68–1023. More specifically, a jet or fan engine that does not include a rearwardly disposed aperture array generates rearward noise having a "center" that lies substantially beyond the rear edge of a conventional wing when such an engine is mounted on the wing as herein illustrated and described. Thus, the wing provides little or no noise protection for nearby persons or equipment. The present invention, on the other hand, overcomes this difficulty by placing a multiple aperture array in the exhaust stream. The multiple aperture array "moves" and "center" of the engines rearward noise source closer to the engine, along the engine's longitudinal axis. The movement is such that the center of the noise source is now positioned above the wing. Thus, the multiple aperture array, in combination with the wing suppresses noise in the environment surrounding the aircraft, particularly the environment that fans outwardly from below the wing along a surface defined by the line-of-sight extending between the noise source and the edges of the wing. The volume or size of this region increases as the aircraft gains altitude during takeoff. Consequently, the invention is not only effective when the aircraft is on the ground but it is also effective in flight. In essence, the wing acts to "reflect" sound upwardly rather than allowing it to diverge downwardly. Preferably, the upper surface of the wing supports a sound absorbent material that acts to eliminate some of the sound entirely.

While a multiple aperture array 20 could be permanently affixed to the rear of each engine 18, preferably the arrays are rectractable. Thus, as illustrated in FIGS. 2–5, formed in the upper surface of each wing 15 immediately adjacent the rear end of each nacelle 19 is a compartment 21. While the compartments 21 are illustrated as rectangular box-shaped compartments, it will be appreciated that they can take on any suitable shape, as desired. As illustrated, the compartments are arrayed such that two on their upper edges lie parallel to the longitudinal axis of their associated engine.

Access to the compartment 21 is through the top. While a single door may be utilized, preferably, a pair of doors 23 open and close the access opening to each compartment, as necessary. More specifically, the doors 23 are hinged along one edge of wings. The hinges lie along the edges of the compartments that lie generally parallel to the longitudinal axes of the engines 18. The doors are formed so as to join together along their edges remote from their hinge edges. Moreover, the doors 23 are formed such that their outer surfaces lie flush with the adjacent upper surfaces of the wing 15 when the doors are closed. Thus, the outer surfaces of the doors 23 form a portion of the upper surface of their associated wings 15 when the doors are closed.

The illustrated doors are rotatable upwardly through an arc of approximately 90° from their closed positions to their open positions. When in their open positions, the doors are located on either side of the longitudinal axis defined by their associated engine 18 and are essentially perpendicular to the upper surface of their associated wing 15.

When in their open position, the doors allow the multiple aperture arrays to be moved between the compartments 21 and their operative positions, in the manner hereinafter described.

The doors 23 may take on a variety of forms. The illustrated doors are hinged to the compartment such that they are aligned with the local air flow then they are open. The doors may either remain open after the multiple aperture arrays are moved to their operative position, or close. In the former case, preferably, the inner surfaces of the doors are lined with an acoustically absorbent material. In the latter case, preferably, the outer surfaces of the doors are covered with an acoustically absorbent material.

While the illustrated doors are single element doors, obviously other types of doors may also be used. For example, the doors could be accordion doors of the type heretofor associated with aircraft landing gear.

At this point it should be noted that, for purposes of clarity, specific mechanical mechanisms for opening the doors are only illustrated schematically in FIG. 4 as actuators 24. These mechanisms can take on a variety of forms that will be apparent to persons of ordinary skill in the aircraft art, and others. For example, hydraulic or pneumatic actuators can be used to open the doors. Alternatively, ball-screw electromechanical mechanisms and the like can be utilized to perform these operations.

The particular multiple aperture arrays 31 illustrated in FIGS. 2-5 comprise a cylindrical support plate 33 that supports a multiplicity of tubes 35. The tubes may be right circular cylinders or conically shaped, as desired. The tubes 35 are fixed to the support plate 33 so as to form an array of tubes that extend outwardly from one surface thereof. The longitudinal axes of tubes are substantially parallel. It is again pointed out here that the plate and tubes only form one type of a multiple aperture array that is useful by the invention. Other types of arrays may also be used, as noted above.

The support plate 33 includes a planar, outwardly extending arm 37. The arm terminates in an enlarged region 39 through which a cylindrical aperture passes. The axis of the cylindrical aperture lies at right angles to the axis defined by the outwardly extending arm 37. The enlarged region 39 lies between a pair of flanges 41 affixed to, and extending outwardly from, the forward wall 43 of the compartment 21. The forward wall 43 is the wall generally parallel to, and nearest, the leading edge of its associated wing 15. The flanges 41 include apertures lying coaxial with the cylindrical aperture formed in the enlarged region 39 of the arm 37. A pin 45 passes through the apertures in the flanges 41 and the aperture in the enlarged region 39. Thus, the arm 37 and the flanges 41 form a hinge which allow the support plate 33 and the noise suppression tubes 35 to be moved through an arc are of approximately 90° between a stowed position and an operative position. In the stowed position, the support plate 33 and the tubes 35 lie in their associated compartment 21. When these elements are in this position, the doors 23 are closed, as discussed above and illustrated in FIGS. 3 and 5, and their outer surfaces form a portion of the upper surfaces of their associated wings 15.

In the operative position, the multiple aperture array 31 is located at the rear of the nacelle 19 of the associated engine 18 such that the array of tubes 35 extend toward the trailing edge of the associated wing 15. In addition, when in the operative position, the longitudinal axes defined by the plurality of tubes 15 lie in, and are generally coaxial with, the exhaust stream of the associated engine 19. Thus, the cylindrical (or conical) apertures defined by the tubes (which extend through the support plate 33) lie in the exhaust streams. When in this position, the support plate 33 impinges on the rear edge of the associated nacelle 19 and lies in a plane generally orthogonal to the longitudinal axis defined by the engine 18. Thus, the jet exhaust stream is forced to pass through the tubes 35. The tubes 35 split the exhaust stream into a plurality of exhaust streams which mix with each other and entrained ambient air after emergence from the tubes. As will be understood by those skilled in the jet engine noise suppression art splitting and then mixing the exhaust stream in this manner suppresses some of the noise associated with an unsuppressed exhaust stream. In addition, and more importantly to the present invention, this action moves the "center" of the noise source from a position well beyond the trailing edge of the wings to a position above the wings whereby the wings shield a portion of the surrounding environment (community) from the noise generated by the noise source.

Since it is desirable for engine efficiency that the total area defined by the openings in the multiple aperture array be equal to some exhaust opening size value depending on the size and nature of the particular engine and since this size is not compatible with the size of the nacelle exhaust opening when the multiple aperture array is not in its operative position due to the area covered by the non-apertured portion of the plate, it is preferred that the nacelle have a variable area exhaust opening 47. Since variable area exhaust nozzles are well known in the jet aircraft art no specific one is illustrated and described herein. Obviously, the exhaust nozzle must be controlled such that it expands when the multiple aperture array is in its operative position and necks down when the multiple aperture array is in its stowed position.

In addition, while not absolutely necessary, a suitable mechanism for clamping or affixing the multiple aperture array to the nacelle when the multiple aperture array is in its operative position is preferred. Further, a suitable means may be included to cool the multiple aperture array during or after use (i.e., when stowed), if desired. Such means may include a mechanism for forcing a cooling fluid to flow through cooling apertures formed in the multiple aperture array, for example.

It will be appreciated from the description thus far that the invention provides an uncomplicated mechanism adapted to suppress the noise of a jet engine exhaust stream when an aircraft is located on the ground or at low altitude levels. Because the multiple aperture array, which is external to the normal engine, can be moved to a stowed position when the aircraft is at medium or high altitudes, engine efficiency is increased. That is, engine thrust losses associated with a "fixed-inplace" multiple tube suppression system are eliminated at medium and high altitudes (or whenever else desired—such as when the aircraft is at low altitude, but in an unpopulated area). Thus, because the noise suppressor isn't used under these conditions, fuel economy and payload are increased.

As with the mechanical mechanism for opening and closing doors 23, the mechanical mechanism for moving the multiple aperture arrays 31 between their stowed and operative positions is only illustrated schematically in FIG. 4 (as an actuator 42) for reasons of clarity and because such mechanisms will be apparent to persons skilled in the art. In this regard any suitable hydraulic, pneumatic or electromechanical mechanisms can be used to move the arrays between their stowed and operative positions.

In addition to the noise shielding provided by the wings, the upwardly extending doors 23 provide additional, lateral noise shielding. Specifically, because the doors are located on either side of the exhaust stream when open, they prevent the lateral distribution of exhaust noise if left open. Thus, both the aircraft fuselage and the surrounding community are further protected. Obviously such protection is of particular importance when an aircraft is located on the ground.

It will be appreciated from the foregoing description that the invention provides a new and improved noise suppression mechanism particularly suitable for use by jet aircraft having engine exhaust streams that pass chordwise above the wings of the aircraft. The invention makes the utilization of a multiple tube noise suppressor structure more economical than in the past because the suppressors are moved between stowed positions and operative positions. In this way, the suppressors are only utilized when necessary to diminish community noise pollution and to prevent damage to the human ear, and not used when such protection becomes unnecessary. In addition, the invention makes the use of such structures more practical than they have been in the past.

While a preferred embodiment of the invention has been illustrated and described, it will be appreciated by those skilled in the art and others that various changes can be made therein without departing from the spirit and scope of the invention. For example, the multiple aperture arrays could each be split into two halves and rotated upwardly so as to move transversely into the exhaust stream from either side, rather than upwardly through the exhaust stream. Hence, the invention can be practiced otherwise than as specifically described herein.

The embodiments of the invention in which an exclusive property or privilege is claimed are defined as follows:

1. In a jet aircraft including wings and jet engines mounted such that the exhausts of said jet engines pass chordwise over said wings and create noise sources having centers located beyond the trailing edge of said wings, the improvement comprising a plurality of multiple aperture arrays, one of said multiple aperture arrays being associated with each of said jet engines of said aircraft, each of said multiple aperture arrays being movable between a stowed position whereat said multiple aperture array lies outside of the exhaust path of the jet engine with which said array is associated and an operative position whereat said multiple aperture array lies in the exhaust path of the jet engine with which said array is associated, each of said multiple aperture arrays including a plurality of apertures spaced from one another and positioned so as to split the exhaust of the jet engine with which said array is associated into separate streams when said array is in its operative position, said spacing being such that ambient air is entrained by said separate streams and mixes with the separate exhaust streams of said jet engines, said entraining and mixing of said ambient air with said exhaust streams causing the centers of said noise sources to be moved from said locations beyond the trailing edge of said wings to said locations above the wings of said aircraft.

2. The improvement claimed in claim 1 including:
a plurality of open-topped compartments formed in the upper surface of said wings, one of said compartments being located immediately rearwardly of the region of exhaust emission of each engine of said jet aircraft;
a closure means associated with each of said compartments and movable between open and closed positions to allow access to the associated compartment from above when said closure means is in said open position;
a closure opening and closing means associated with each of said closure means for moving the associated closure means between said open and closed positions;
a mounting means associated with each of said compartments for mounting one of said multiple aperture arrays in each of said compartments, each of said multiple aperture arrays being mounted for movement between said stowed positions, whereat said multiple aperture array is located in the compartment in which it is mounted and said operative position, whereat said multiple aperture array lies in the exhaust path of the jet engine with which said array is associated; and,
a multiple aperture array movement means associated with each of said multiple aperture arrays for moving each of said multiple aperture arrays between said stowed and said operative positions.

3. The improvement claimed in claim 2, wherein each of said closure means comprises at least one door, said door movable between a closed position whereat said door prevents access to its associated compartment from above and an open position whereat said door allows access to said compartment from above.

4. The improvement claimed in claim 3 wherein each of said multiple aperture arrays includes a plurality of tubular members having longitudinal axes that lie in the exhaust path of the jet engine with which said array is associated when said multiple aperture arrays are in their operative positions.

5. The improvement claimed in claim 4 wherein each of said compartments is rectangular in shape and oriented such that two opposing walls of each of said compartments define planes lying parallel to the longitudinal axis of the jet engine with which the multiple aperture array mounted in said compartment is associated, and wherein each of said closure means comprises a pair of doors, one of said doors hinged to the upper edge of one of said two opposing walls and the other of said doors hinged to the upper edge of said other of said two opposing walls.

6. The improvement claimed in claim 5, wherein each of said mounting means comprises a hinge for hinging the one of said multiple aperture array mounted in a particular compartment to a further wall of said particular compartment, said further wall lying transverse to said two opposing walls.

7. The improvement claimed in claim 6, wherein the outer surfaces of each of said doors form a portion of the upper surface of the wing in which the open-topped compartment closed by said door is associated, when said doors are in their closed position, and wherein said doors lie on either side of the exhaust path of the jet engine with which the multiple aperture array mounted in the compartment closed by said door is associated when said array is in its operative position.

* * * * *